United States Patent [19]

Dupuy et al.

[11] Patent Number: 5,479,409
[45] Date of Patent: Dec. 26, 1995

[54] METHOD OF TRANSMITTING TIMING ADVANCE DATA TO A MOBILE STATION IN A CELLULAR MOBILE RADIO NETWORK AND CORRESPONDING MOBILE STATION, BASE STATION CONTROLLER AND TRANSMISSION SYSTEM

[75] Inventors: Bernard Dupuy, Paris, France; Michael Roberts, Essex, Great Britain

[73] Assignee: Alcatel N.V., Amsterdam, Netherlands

[21] Appl. No.: 120,465

[22] Filed: Sep. 14, 1993

[30] Foreign Application Priority Data

Sep. 15, 1992 [FR] France .................................. 92 10996

[51] Int. Cl.$^6$ ........................................................ H04J 3/16
[52] U.S. Cl. ......................... 370/95.3; 379/60; 455/33.2; 370/100.1
[58] Field of Search .................................. 370/95.1–95.3, 370/100.1, 103; 375/109, 1; 379/59, 60; 455/33.1, 33.2, 54.1, 56.1

[56] References Cited

U.S. PATENT DOCUMENTS

| 3,713,025 | 1/1973 | McNair | 375/118 |
| 4,494,211 | 1/1985 | Schwartz | 375/109 |
| 5,285,447 | 2/1994 | Hulsebosch | 455/33.2 |
| 5,293,380 | 3/1994 | Kondo | 455/33.2 |

FOREIGN PATENT DOCUMENTS 0398773  11/1990  European Pat. Off. .

Primary Examiner—Douglas W. Olms
Assistant Examiner—Ajit Patel
Attorney, Agent, or Firm—Sughrue, Mion, Zinn, Macpeak & Seas; Richard C. Turner; Joseph J. Buczynski

[57] ABSTRACT

A method and system for transmitting timing advance data to a mobile station in cellular mobile radio network and corresponding mobile station, base station controller and transmission system. The method and system of the invention applied to a cellular mobile radio network including a mobile station, at least two base transceiver stations and a base station controller. The exchanges of information between the mobile station and the stations are of the time-division multiple access type. The controller transmits to the mobile station via a first station with which the mobile station is communicating an instruction telling it to interrupt communication with the first station in order to send a sequence of synchronization signals to a second station, enabling the second station to calculate a timing advance. The instruction is transmitted when the mobile station moves from a cell defined by a geographical coverage area of the first station to a second cell defined by the geographical coverage of the second station. The calculated timing advance is supplied to the mobile station. The instruction supplied to the mobile station also indicates that the mobile station must continue to communicate with the first station immediately after sending the first sequence of synchronization signals to the second station, and the calculated timing advance is transmitted from the second station to the controller and from the controller to the mobile station via the first station.

40 Claims, 6 Drawing Sheets

METHOD OF TRANSMITTING TIMING ADVANCE DATA TO A MOBILE STATION IN A CELLULAR MOBILE RADIO NETWORK AND CORRESPONDING MOBILE STATION, BASE STATION CONTROLLER AND TRANSMISSION SYSTEM

BACKGROUND OF THE INVENTION

1. Field of the Invention

The invention concerns the transmission of timing advance data to mobile stations in a cellular mobile radio network such as a GSM (Groupe Special Mobile) network when mobile stations move from one cell to another. The mobile stations are car phones, for example, and the timing advance data must enable a mobile station moving from one cell to another to advance the timing of its transmission of digital data so that it is synchronized with the transceiver station of the new cell. The standard term for this procedure in the GSM system is "handover" and this term is used hereinafter.

2. Description of the Related Art

The following description uses the standard GSM terminology. For more information on this reference may usefully be had to the proceedings of the "Digital Cellular Mobile Communication Seminar" held in Nice from 16 through 18 Oct. 1990.

FIG. 1 shows the structure of a cellular mobile radio network such as a GSM type network.

A mobile station MS such as a car phone, for example, moves inside a cell C1 defined by the geographical coverage of a base transceiver station BTS1. Other cells C2, C3 each comprise a respective base transceiver station BTS2, BTS3. Each of the stations BTS1 through BTS3 is one component of the GSM network and comprises one or more transceivers each associated with an antenna and processing equipment. The cells overlap in part so that there are no shadow areas. The stations BTS1 through BTS3 are managed by a base station controller BSC. The functions of the BSC include management of BTS frequency channels. A BSC associated with a number of BTS constitutes a base station system BSS. Other controllers may also be provided, each controlling a predetermined number of BTS and each being connected to a mobile services switching center MSC which is the master structure of a GSM network. A given MSC can therefore control the operation of several BSS constituting a public land mobile network (PLMN).

A network of this kind operates as follows: the mobile station MS sends streams of digital data in the form of packets to the base transceiver station BTS1 while it is in the cell C1 and the station BTS1 forwards these streams to the BSC which sends them to their destination via the MSC. This destination may be another mobile station or a fixed station.

Each data packet contains speech data, for example, and is transmitted in a 577 µs time slot, eight consecutive time slots constituting a frame. Eight mobile stations can therefore communicate on the same radio channel, i.e. using the same carrier frequency, using time-division multiple access (TDMA). Between two and four channels are usually assigned to each BTS and between 16 and 32 radio channels are therefore available for transmission (and reception) in each cell.

A problem arising in the GSM system is that of synchronizing time slots assigned to a mobile station to the master clock at the BTS. It is necessary to allow for the propagation time of radio waves between a mobile station and its BTS because the mobile stations and the BTS serving them each have their own internal bit clock. As the duration of a time slot is 577 µs and as a radio wave travels 300 m in 1 µs ($3\times10^8$ m/s), the mobile station clock must allow for a time shift of 1 µs per 300 m of distance between it and the BTS in order to avoid sending data during the time slot assigned to another mobile station.

FIG. 2 is a correlative timing diagram showing signals sent by the base transceiver station BTS1 and by the mobile station MS. It shows how the appropriate timing advance is communicated to the mobile station.

The base transceiver station BTS1 managing the cell in which the mobile station MS is located sends a clock signal $H_0$, $H_1$, $H_2$, $H_4$ regularly, at times $T_0$, $T_1$, $T_2$, $T_3$ and $T_4$ on a synchronization channel SCH which is part of a broadcast control channel BCCH for transmitting synchronization information to the mobile stations. This clock signal is used when the mobile station must be logged onto a cell of the GSM network, for example when it is switched on or in the event of handover (see below).

The mobile station connects to the network for the first time after it is switched on and can receive the clock signal only from the time $MS_{ON}$ at which it is switched on.

Given that the mobile station is not usually located at the base transceiver station BTS1, the first clock signal $H_1$ that it receives after time $MS_{ON}$ is shifted by a time T relative to the time $T_1$ at which it is sent by the station BTS1. The signal $H_1$ is therefore received by the mobile station at time $T_1 + T$.

At this time the mobile station requiring to connect to the base transceiver station BTS1 sends to the latter on a signalling channel a random access message (access burst). In the case of handover this message is called the handover access message (HA). The duration of each handover access is less than that of a burst constituting a normal signal (normal burst), one containing speech data, for example, and accordingly cannot interfere with signals sent by another mobile station in another time slot.

On receiving this signal (at time $T_1$+ TA) the base transceiver station BTS1 can determine the timing advance TA between reception of this signal and transmission of the clock signal $H_1$. This is equal to twice the time to transmit a signal between the mobile station and the base transceiver station BTS1, i.e. twice the time T. The base transceiver station BTS1 then sends a message to the mobile station over the access grant channel AGCH to tell it that it must send its signals with a timing advance TA relative to its clock signal: the mobile station can then send normal signals without risk of them overlapping with those sent by other mobile stations. This ensures that the signals sent by the various mobile stations on a given transmission channel arrive in succession at the base transceiver station BTS1.

This ensures that the signals sent by the various mobile stations on a given transmission channel arrive in succession at the same BTS without these signals overlapping. However, it is necessary to synchronize the mobile stations frequently because their distance from the BTS serving them may vary.

The problem of managing movement of the mobile station from one cell to another is well known. In FIG. 1 the mobile station receives signals not only from base transceiver station BTS1 but also from base transceiver stations BTS2 and BTS3. If the power of the signals received from base transceiver station BTS1 falls below that of signals received from base transceiver station BTS2, for example, the BSC connects the mobile station to base transceiver station BTS2 from which transmission then continues. This is the typical situation when the mobile station moves away from base transceiver station BTS1 and towards base transceiver station BTS2. It is then necessary to modify the timing advance TA so that the mobile station is synchronized to the base transceiver station BTS2 of the new cell C2.

There are three known types of handover for achieving such synchronization: synchronous handover, pseudosynchronous handover and asynchronous handover. Which type is used depends on whether the base stations are respectively synchronized, have an internal clock at the same frequency and of known phase, or have asynchronous clocks whose relative phase is unknown.

Synchronous handover consists in controlling the clocks of the various BTS of a given GSM system so that their clock signals are synchronized. It is therefore unnecessary to supply a mobile station with a new timing advance when it moves from one cell to another because the new timing advance is deduced immediately from that previously used. To be generally adopted this solution would require synchronization of all BTS, however, and would therefore be costly to implement.

To alleviate this problem pseudosynchronous handover is used to synchronize a mobile station to the clock of the BTS of the new cell allowing for the time shifts between the clocks of the old and new BTS. This type of handover is described in European patent application n° 0 398 773 in the name of MATRA COMMUNICATION published on 22 Nov. 1990, for example. This solution has the drawback that it is complex to implement and that the BSS requires a learning phase.

Asynchronous handover is the simplest method to implement and therefore the method most widely used. FIG. 3 shows the general principle. Consider the case where the mobile station MS leaves cell C1 to enter cell C2. Eight successive transmission steps are necessary.

Step 1 is that in which the mobile station MS sends the base transceiver station BTS1 a message MEAS REP equivalent to a cell change request. This standardized message is sent every 0.5 s. In step 2 the base transceiver station BTS1 transmits this information (message MEAS RES) to the BSC which decides if handover is needed. This decision is taken if the message MEAS REP indicates that the mobile station MS is no longer receiving under optimum conditions and that the mobile station is receiving the signals sent periodically by the station BTS2 better than those sent by the station BTS1, for example. The BSC and the MSC can also decide for themselves if handover is needed, allowing for other criteria in taking their decision. In step 3 the base station controller BSC activates a channel of the base transceiver station BTS2 (message CHAN ACT) and the latter acknowledges the allocation (message CHAN ACT ACK). In step 4 the base station controller BSC sends a handover command (message HANDOVER CMD) to the base transceiver station BTS1 which immediately forwards it to the mobile station MS transparently. The handover procedure at the mobile station MS then begins (step 5). The mobile station sends successive messages HA (handover access) to base transceiver station BTS2 with a null timing advance, i.e. without allowing for the distance between them. This step is that described previously with reference to FIG. 2. The new timing advance that the mobile station MS must use is unknown to it and the base transceiver station BTS2 has to calculate it and supply it (message PHYS INFO including the TA). The station BTS2 also sends a message HO DETECTION (TA) to the BSC. In step 6 the mobile station MS sends a connection message SABM to the base transceiver station BTS2 using the new synchronization. The base transceiver station BTS2 advises the base station controller BSC of this (message ESTABLISH INDICATION) and signals to the mobile station MS that it has understood correctly (message UA). In step 7 the mobile station MS sends a message HANDOVER COMPLT to the base transceiver station BTS2 to advise it that the handover procedure is finished. This station immediately forwards this message to the BSC. The BSC then advises the mobile services switching center MSC (message HANDOVER PERFORMED). In step 8 the BSC sends the message RF CHAN REL to the base transceiver station BTS1 to tell it to release the time slot previously allocated to the mobile station MS. The base transceiver station BTS1 responds with the message RF CHAN REL ACK. At this stage the mobile station MS is communicating with the base transceiver station BTS2 which has allocated it a time slot in a frame carried by a given carrier and a timing advance TA.

The main drawback of asynchronous handover is that the sending of the timing advance TA to the mobile station is time-consuming: it takes about 40 ms plus about 10 ms for calculating the TA. The mobile station is not able to send data during this time. Also, sending of the signals HA is mandatory in the GSM system and takes 5 ms per signal. Other delays contribute to delaying handover and calls are frequently interrupted for more than 100 ms. Speech extrapolation software is available for masking interruptions in transmission but is effective only for a subjectively determined time dependent on the hearing of the persons concerned. It is generally agreed that an interruption in communication exceeding 80 ms is audible to a person with good hearing whereas a party paying no particular attention to the quality of the speech signals received may not notice for 200 ms that what he is hearing is not what he should be hearing (because the signals are generated by the speech extrapolation software).

Likewise the mobile station user cannot receive speech type data while the mobile station is in the handover phase. This drawback is a particular problem in urban areas where cell sizes are smaller and the user may pass through several cells during the course of the same conversation. A system of this kind is not comfortable to use for this reason.

SUMMARY OF THE INVENTION

One object of the present invention is to remedy these drawbacks.

To be more precise, one object of the invention is to provide a handover method that can be applied to a cellular mobile radio network in which the base transceiver stations are not synchronized, for example an asynchronous type network, the least costly and the most widely used type, so that the time for which communication is interrupted during handover is reduced.

Another object of the invention is to provide a mobile station, a station controller and an information exchange system using this handover method.

These objects and others that will emerge hereinafter are achieved by virtue of a method of exchanging information between a mobile station, at least two transceiver stations and a station controller of a cellular mobile radio network in which exchanges of information between the mobile station and the stations are of the time-division multiple access type, said method consisting in:

transmitting from said controller to said mobile station via a first station with which said mobile station is communicating an instruction telling it to interrupt communication with said first station in order to send to a second station a first sequence of synchronization signals enabling said second station to calculate a timing advance, said instruction being transmitted when said mobile station moves from a first cell defined by the geographical coverage area of said first station to a second cell defined by the geographical coverage area of said second station, and supplying said calculated timing advance to said mobile station, said method being characterized in that:

said instruction supplied to said mobile station also indicates that said mobile station must continue to communicate with said first station immediately after sending said first sequence of synchronization signals to said second station, and in that it further consists in:

transmitting said calculated timing advance from said second station to said controller, and transmitting said calculated timing advance from said controller to said mobile station via said first station.

This internal handover procedure can therefore limit the interruption to communication between the mobile station and the first station to a time corresponding to transmission of the first sequence of synchronization signals. This interruption lasts about 25 to 30 ms and interrupts speech for 60 to 80 ms which can be masked by speech extrapolation software.

In one advantageous embodiment the method consists in transmitting a second sequence of synchronization signals from said mobile station to said second station after the calculated timing advance is received.

This last step is identical to that used in a cellular mobile radio network with synchronous base transceiver stations and has the advantage of enabling the mobile station to use a known procedure to simplify implementation of the invention within the mobile station.

In the case of external handover (when the two base transceiver stations are not part of the same BSS), the method of the invention uses a mobile station, at least first and second transceiver stations, first and second controllers respectively controlling the first and second stations and a switching center controlling the first and second controllers. Exchanges of information between the mobile station and the first and second stations are of the time-division multiple access type and the method consists in:

transmitting an instruction from said first controller to said mobile station telling it to interrupt communication with said first station with which it is communicating in order to send a first sequence of synchronization signals to said second station enabling it to calculate a timing advance, said instruction being transmitted when said mobile station moves from a first cell defined by the geographical coverage area of said first station to a second cell defined by the geographical coverage area of said second station, and supplying said calculated timing advance to said mobile station, said method being characterized in that:

said instruction supplied to said mobile station also indicates that said mobile station must continue to communicate with said first station immediately after sending said first sequence of synchronization signals to said second station, and in that it further consists in:

transmitting said computed timing advance from said second station to said second controller, transmitting said computed timing advance from said second controller to said switching center, transmitting said computed timing advance from said switching center to said first controller, transmitting said computed timing advance from said first controller to said mobile station via said first station.

The procedure is longer in this case because the timing advance passes through the switching center controlling the two controllers.

In this external handover method it is also advantageous to provide for transmission of a second sequence of synchronization signals by the mobile station to the second station after it has received the calculated timing advance.

In the case of application of the internal or external handover method to a GSM type cellular mobile radio network, the calculated timing advance is preferably transmitted from the second station to the controller with which it is associated in a synchronization detected indication.

Thereafter, in the case of external handover, the calculated timing advance is also advantageously transmitted from the second controller to the switching center and from the switching center to the first controller in a synchronization detected indication. Here otherwise unused bits are used to transmit the timing advance.

The invention applies preferentially to cellular mobile radio networks comprising asynchronous BTS with an unknown phase shift between their clock signals.

The present invention also consists in a mobile station such as a mobile radio used in a system of this kind. This mobile station comprises signal transceiver means and receives a timing advance when it moves from a first cell defined by the geographical coverage area of a first station with which said mobile station is communicating to a second cell defined by the geographical coverage area of a second station. According to the invention, the mobile station further comprises:

means for detecting an instruction transmitted to it by said first station and which tells it that it must interrupt its communication with said first station to send a first sequence of synchronization signals to said second station and that it must continue to communicate with said first station immediately after sending said first sequence of synchronization signals to said second station, and means for detecting a control signal transmitted to it by said first station and containing said timing advance.

The mobile station may further comprise means for deciding to send a second sequence of synchronization signals to said second station when it receives said control signal containing said timing advance.

The invention also concerns a base station controller for base transceiver stations of a cellular mobile radio network with at least one mobile station, said controller comprising:

means for receiving a timing advance transmitted to it in a message sent by a second station with which said mobile station wishes to communicate after a synchronization message is sent by said mobile station to said second station when it moves from a first cell defined by the geographical coverage area of a first station with which said mobile station is communicating to a second cell defined by the geographical coverage area of said second station, and means for sending a control signal to said first station containing said timing advance for said mobile station.

This controller advantageously further comprises means for sending information containing said calculated timing advance to a switching center upon reception of said message sent by said second station.

The invention also concerns a system of exchanging information between a mobile station, at least two base transceiver stations and a base station controller for said stations, said exchanges of information between said mobile station and said stations being of the time-division multiple access type, said mobile station comprising means for detecting an instruction telling it when it moves from a first cell defined by the geographical coverage area of a first station with which said mobile station is communicating to a second cell defined by the geographical coverage area of a second station that it must send a sequence of synchronization signals to said second station which comprises means for calculating a timing advance to be supplied to said mobile station, characterized in that said mobile station continues to communicate with said first station immediately after sending said sequence of synchronization signals to said second station, in that said second station includes means for sending said calculated timing advance to said controller, in that said controller comprises means for sending said calculated timing advance to said first station, and in that said first station comprises means for forwarding said calculated timing advance to said mobile station.

In the case of external handover in accordance with the invention the system of exchanging information in a cellular mobile radio network between a mobile station, a first base transceiver station associated with a first base station controller and a second base transceiver station associated with a second base station controller, said controllers being controlled by the same mobile services switching center, said exchanges of information between said mobile station and said stations being of the time-division multiple access type, said mobile station comprising means for detecting an instruction telling it when it moves from a first cell defined by the geographical coverage area of said first station with which said mobile station is communicating to a second cell defined by the geographical coverage area of said second station that it must send a sequence of synchronization signals to said second station which comprises means for calculating a timing advance to be supplied to said mobile station, characterized in that said mobile station continues to communicate with said first station immediately after sending said sequence of synchronization signals to said second station, in that said second station comprises means for sending said calculated timing advance to said switching center via said second controller, in that said switching center comprises means for sending said calculated timing advance to said first controller, in that said first controller comprises means for sending said calculated timing advance to said first station, and in that said first station comprises means for forwarding said calculated timing advance to said mobile station.

BRIEF DESCRIPTION OF THE DRAWINGS

Other features and advantages of the invention will emerge from the following description of a preferred embodiment of the invention given by way of non-limiting illustrative example with reference to the appended drawings in which.

DESCRIPTION OF THE PREFERRED EMBODIMENTS

Figure 1:
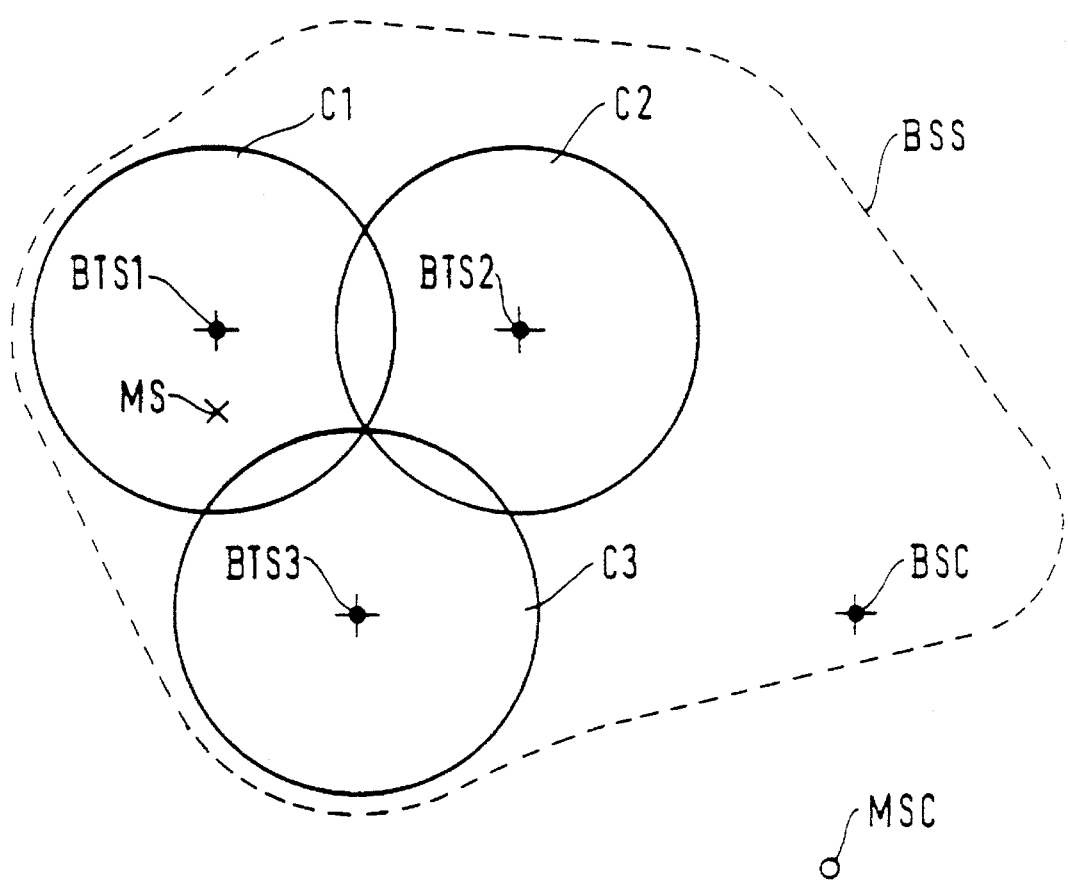
FIG. 1 shows the structure of a GSM type network.
Figure 2:
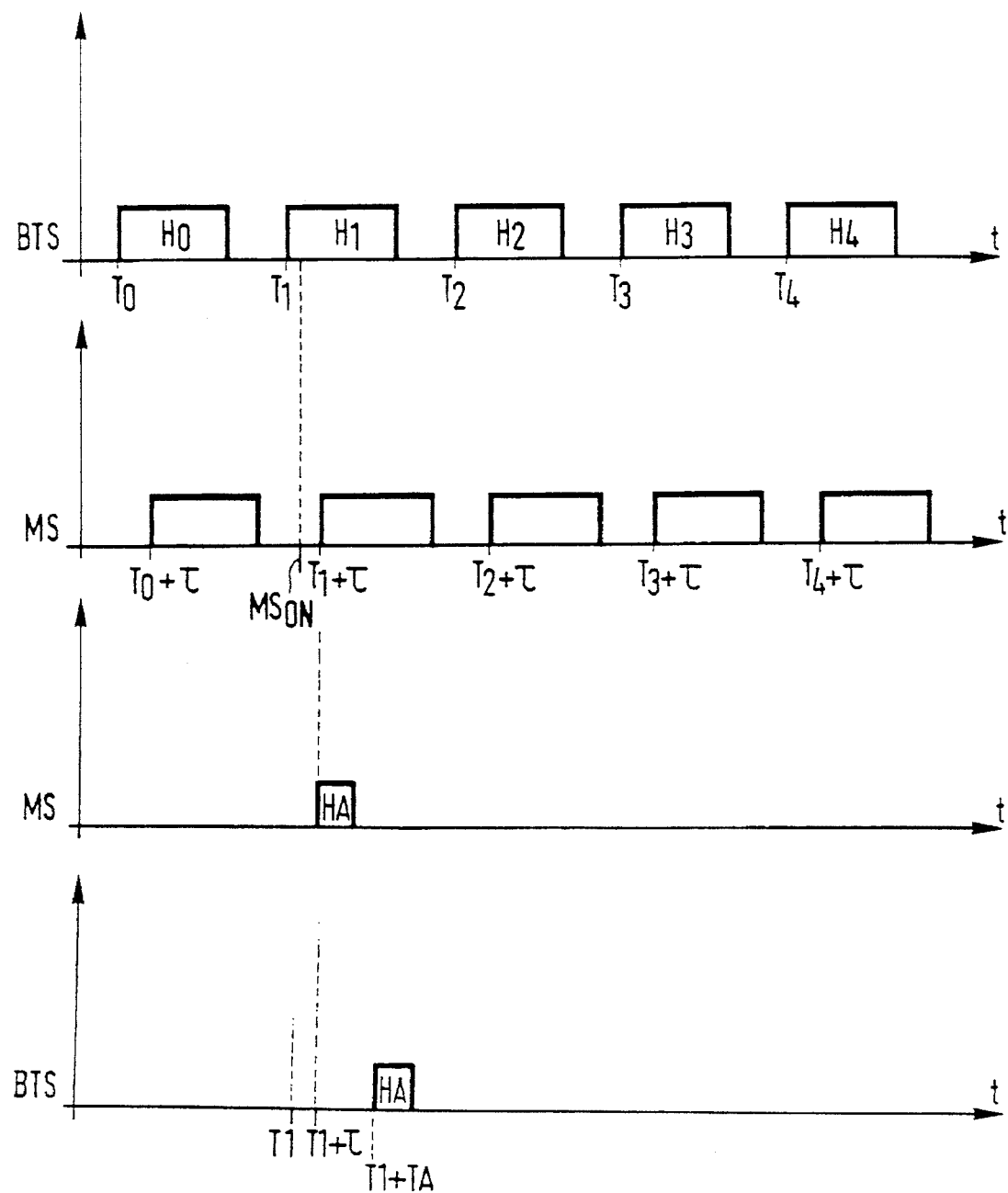
FIG. 2 is a correlative timing diagram of signals exchanged between a station and a mobile station.
Figure 3:
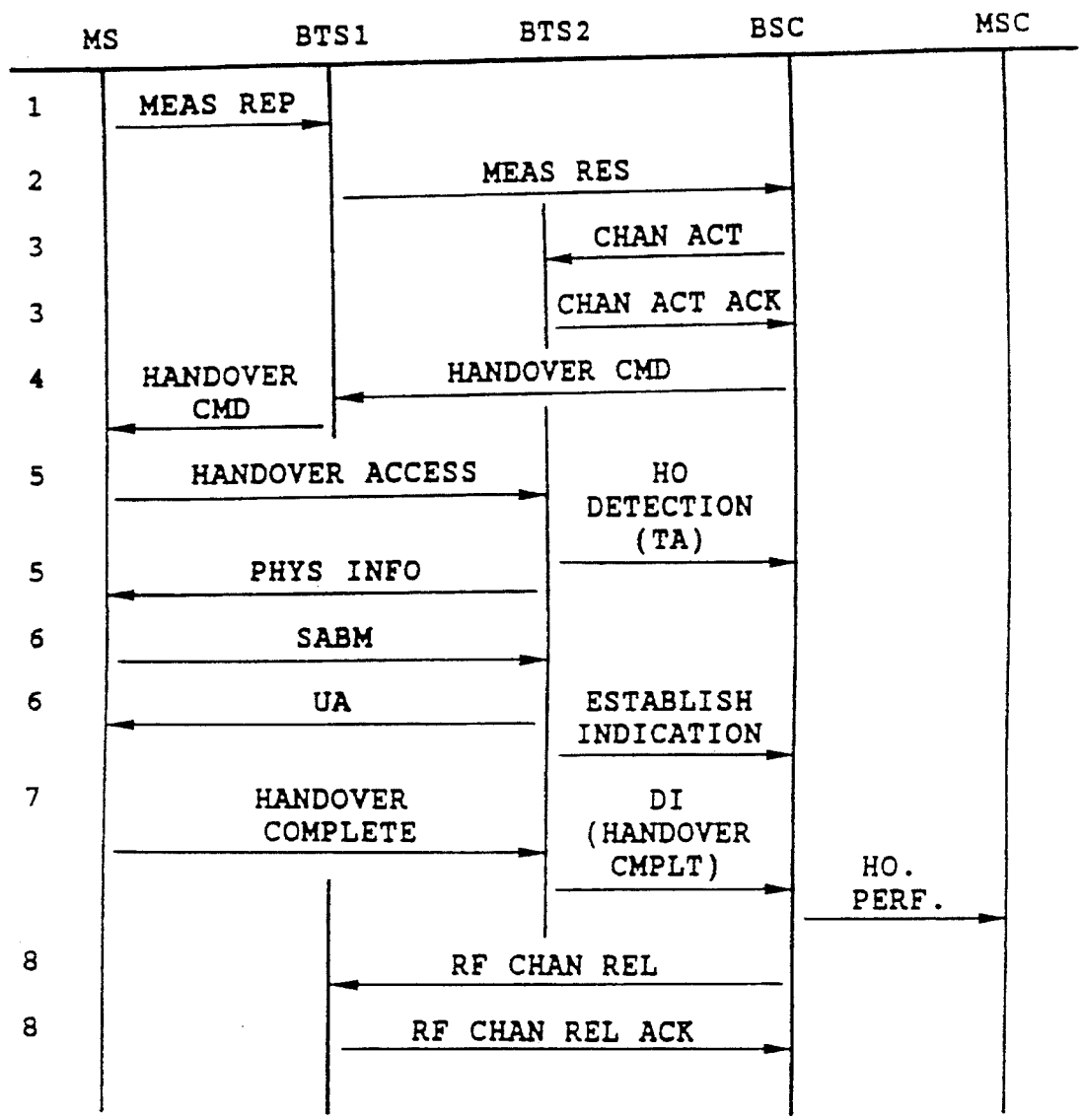
FIG. 3 shows an internal handover procedure requested by a mobile station requiring to connect the station of a cell.

FIGS. 1 through 3 have been described previously with reference to the state of the art.

Figure 4:
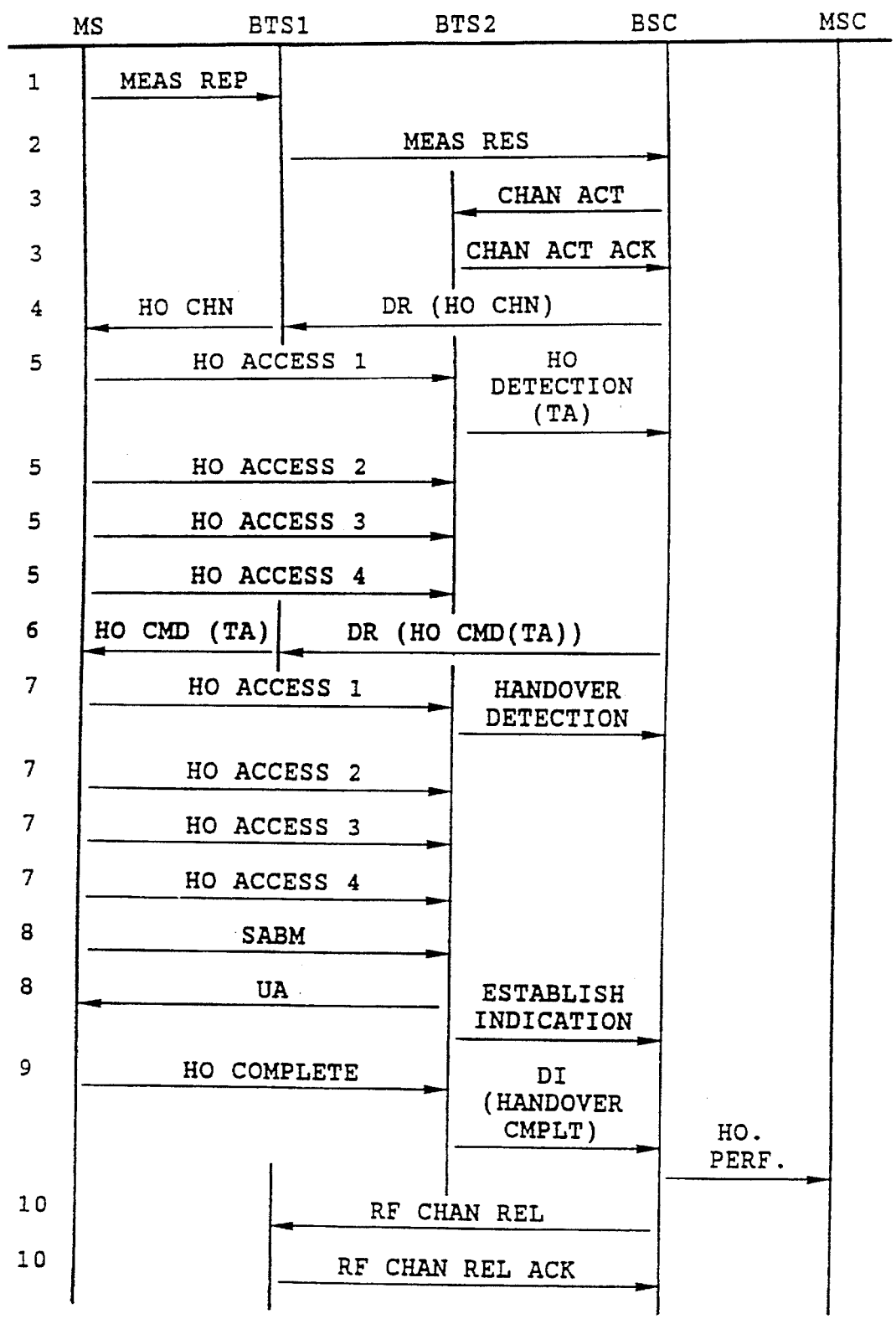
FIG. 4 shows an internal handover procedure in accordance with the invention.

FIG. 4 shows an internal handover procedure in accordance with the invention, i.e. the station with which the mobile station is communicating and that with which the mobile station wishes to set up communication are part of the same BSS.

Steps 1 through 3 previously described with reference to FIG. 3 are identical in the context of the invention, i.e. the BSC considers that it is necessary to carry out a handover procedure because the mobile station MS could communicate better with the station BTS2 than with the station BTS1 with which it is currently communicating. The BSC activates a channel of the station BTS2 which acknowledges the communication, the BSC having determined its characteristics.

The present invention is distinguished from the prior art in that in step 4 the BSC sends a Handover Channel (HO CHN) instruction telling the mobile station MS a) that it must interrupt its communication with the first station BTS1 in order to send a (first) sequence of synchronization signals HO ACCESS (step 5) to the second station BTS2 to enable the latter to measure the synchronization signal transit time which is equal to half the timing advance TA and b) that the mobile station MS must continue to communicate with the first station BTS1 immediately after sending the first sequence of synchronization signals HO ACCESS. The new message HO CHN is therefore distinguished from the prior art signal HANDOVER CMD in that the mobile station MS continues to communicate with the first station BTS1 after sending the synchronization messages HO ACCESS and communication with BTS1 is interrupted for only about 25 to 30 ms (sending of four successive messages). The number of successive synchronization messages is not necessarily four, of course, and may be smaller. The instruction HO CHN is forwarded transparently by the station BTS1 to the mobile station MS.

When the station BTS2 receives one of these synchronization messages it calculates the timing advance (TA) and supplies it to the BSC in a synchronization detection message HO DETECTION (TA). The BSC then sends to the mobile station via the station BTS1 a control signal HO CNMD (TA) (step 6) containing the timing advance TA.

The mobile station MS then knows the timing advance it must use to communicate with the station BTS2.

On receiving TA the mobile station may send a second sequence of synchronization signals HO ACCESS (step 7). Operation is then identical to that of a synchronous type cellular mobile radio network, the advantage of which is that it enables the mobile station to use a known procedure to simplify implementation of the invention within the mobile station.

Steps 8 through 10 are identical to steps 6 through 8 in FIG. 3, i.e. the procedure ends by informing the MSC that the handover procedure has succeeded. The mobile station MS is then in communication with the station BTS2.

Figure 5:
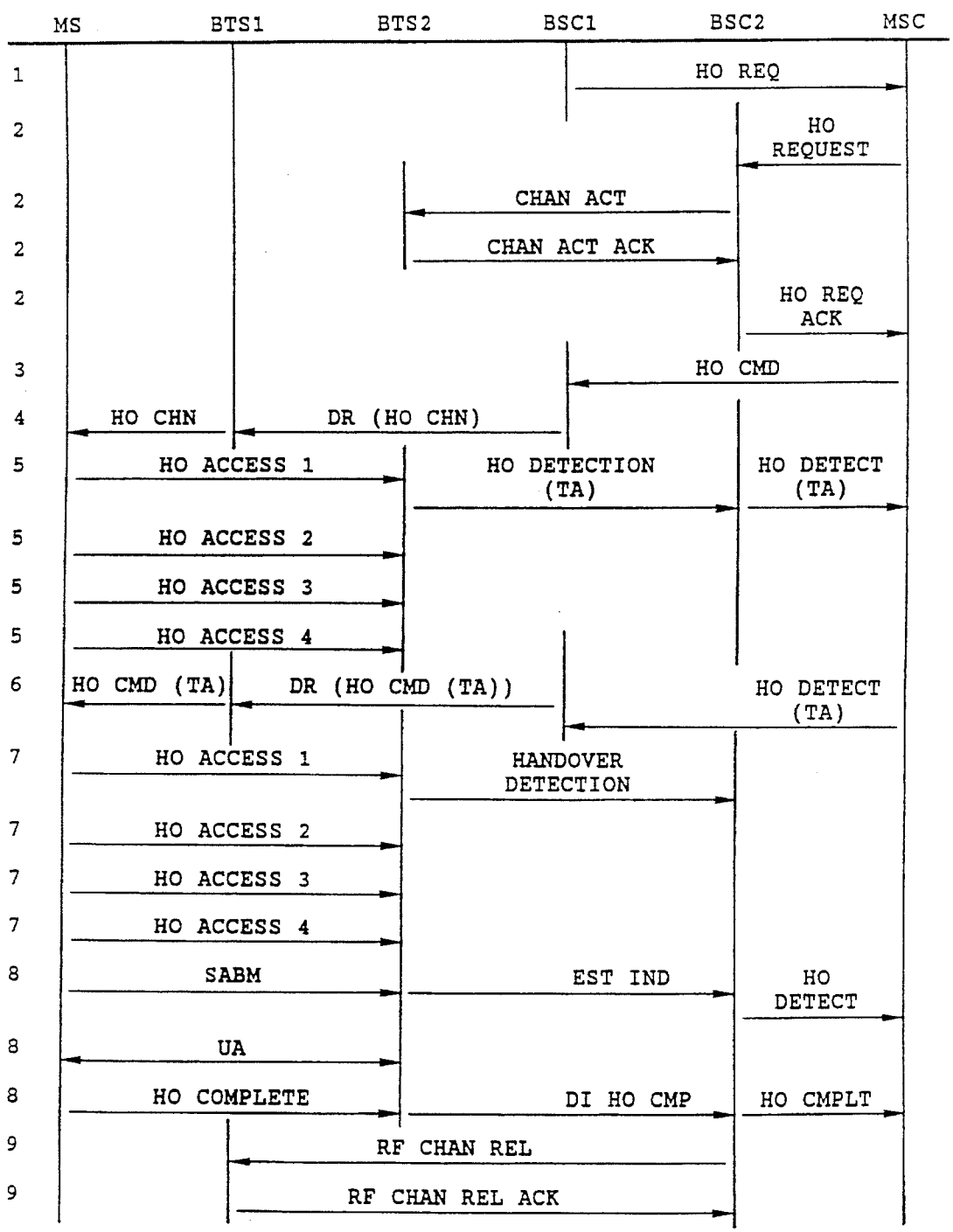
FIG. 5 shows an external handover procedure in accordance with the invention.

The present invention naturally applies also to external handover procedures, i.e. when the stations BTS1 and BTS2 are in different BSS. FIG. 5 shows a procedure of this kind and the intended configuration is such that the mobile station MS is communicating with the station BTS1 controlled by the controller BSC1 and must connect to the station BTS2 controlled by the controller BSC2.

In step 1 the controller BSC1 sends the MSC a message HO REQ indicating that the mobile station MS requires to enter into communication with the station BTS2. In step 2 the MSC sends this request to BSC2 (message HO REQUEST) which interrogates the station BTS2 (message CHAN ACK) to activate one of its channels. BTS2 acknowledges this allocation by a message TRAN ACT ACK and BSC2 sends a message HO REQ ACK to the MSC. In step 3 the MSC generates a handover message (HO CMD) addressed to BSC1 indicating that this new type of handover must be used. In step 4 BSC1 sends an instruction HO CHN to the mobile station MS telling it which frequency channel it must use to enter into contact with BTS2. The mobile station MS interrupts the call in progress and generates four successive messages HO ACCESS (step 5) after which it returns immediately to transmitting speech type data. The station BTS2 detects the first message HO ACCESS 1 and calculates the timing advance TA before forwarding it to BSC2 (message HO DETECTION (TA)). The controller BSC2 sends this information to the MSC (message HO DETECT (TA)). In step 6 the MSC forwards this instruction to BSC1 which generates a handover command (message HO CMD (TA)) to the mobile station MS via the station BTS1. At the end of step 6 the mobile station knows the timing advance TA to use to communicate with the station BTS2.

Likewise in the case of internal handover, to carry out a handover procedure conforming to that of a synchronous cellular mobile radio network, the mobile station MS can send four successive HO ACCESS messages to BTS2 which generates a HANDOVER DETECTION message addressed to BSC2. The remainder of the procedure is identical to that in FIG. 4 except for the sending of an HO DETECT information message from BSC2 to the MSC.

The handover procedure in accordance with the invention can restrict the interruption in communication between a mobile station and its base transceiver station to about 60 to 80 ms and the mobile station does not wait to receive the timing advance TA from the station BTS2. This short interruption in communication is easily masked by speech extrapolation software.

The invention applies to GSM type cellular mobile radio networks, among others, and in particular to networks of this kind in which the stations are asynchronous and the phase shift between the station clocks is unknown. Generally speaking the invention applies to all cellular mobile radio networks in which a timing advance must be supplied to a mobile station when it changes cell.

Figure 6:
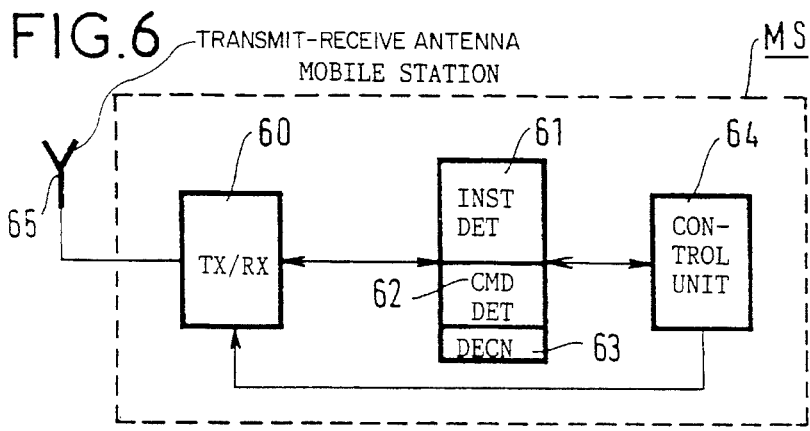
FIG. 6 shows a simplified structure of a mobile station suitable for implementing the method of the present invention.

FIG. 6 shows a simplified structure of a mobile station MS suited to implementation of the method of the present invention.

The mobile station MS, which is a car phone, for example, comprises in the known manner a transmit-receive antenna 65 connected to signal transceiver means 60 including a modulator, a demodulator and amplifier and gain control stages connected to control means 64 which control the operation of the mobile station MS. In accordance with the invention the mobile station MS further comprises means 61 for detecting the instruction HO CHN sent to it by the station with which it is communicating (station BTS1 in the previous examples). Upon detecting this instruction the mobile station MS sends the first sequence of signals HO ACCESS to the station with which it wishes to communicate (station BTS2). The mobile station MS also comprises means 62 for detecting the control signals HO CMD (TA) which among other things extract the timing advance TA. This is sent to the control means 64 which advance the transmission of signals to the station BTS2.

The mobile station MS may optionally comprise means 63 for deciding to send a second sequence of synchronization signals to the station BTS2 when the control signal HO CMD (TA) is detected (step 7 in FIGS. 4 and 5).

Figure 7:
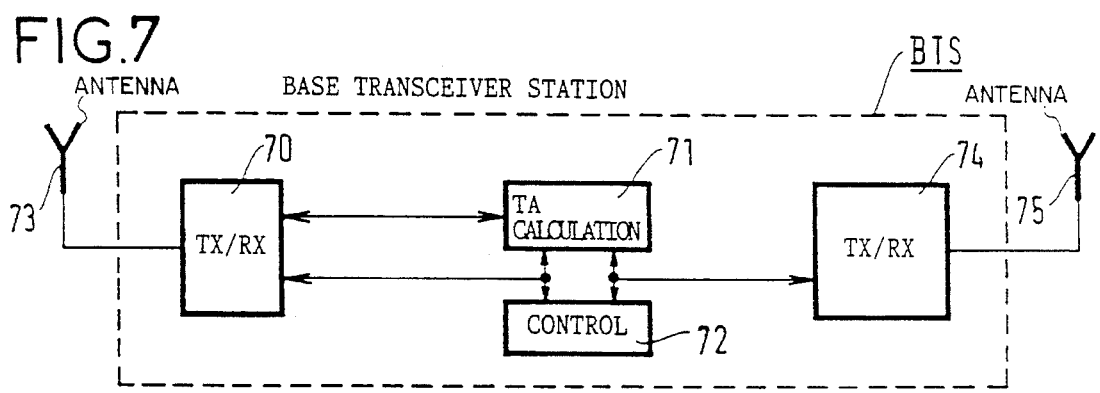
FIG. 7 shows a simplified structure of a base transceiver station BTS.

FIG. 7 shows a simplified structure of a base transceiver station BTS.

The BTS shown is the station BTS2, for example, and is communicating with the mobile station MS using an antenna 73 connected to signal transceiver means 70. Each BTS includes means 71 for calculating the timing advance TA to be communicated to the mobile station. On receiving one of the HO ACCESS signals sent by the mobile station the calculating means 71 (connected to a clock, not shown) measure the time between transmission of a clock pulse and reception of an HO ACCESS signal. This time is that for two-way transmission of signals between the station and the mobile station MS. When the value of TA has been calculated the control means 72 command sending of the message HO DETECTION (TA) to the controller with which this BTS is associated using an antenna 75 connected to transceiver means 74 (microwave transmission) or a physical link (cable, optical fiber, etc).

The transceiver means 70 and 74 may be regarded as signal forwarding means if they merely relay transmissions.

Figure 8:
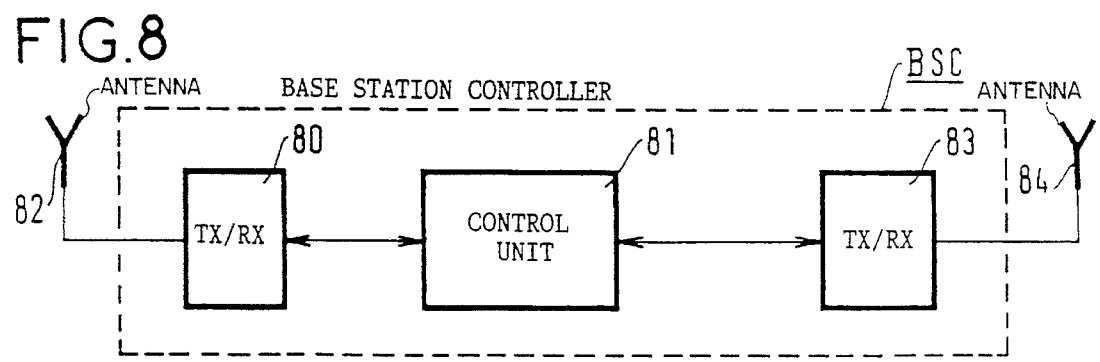
FIG. 8 shows a simplified structure of a base station controller BSC suitable for implementing the method of the present invention.

FIG. 8 shows a simplified structure of a base station controller BSC suitable for implementing the method of the present invention.

Figure 9:
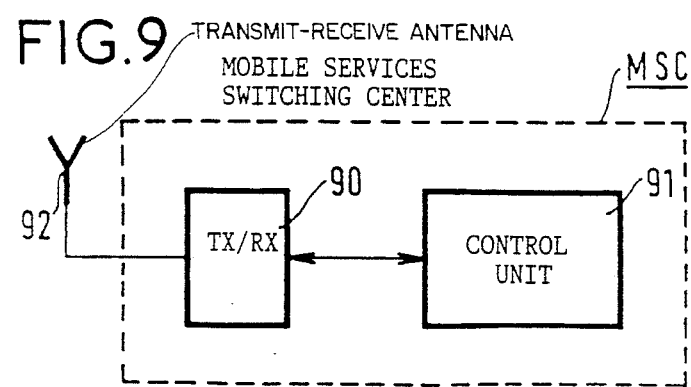
FIG. 9 shows a simplified structure of a mobile services switching center MSC suitable for implementing the method of the present invention.

The BSC shown comprises transceiver means 80 connected to an antenna 82 (or to a physical link for communication with a BTS as shown in FIG. 7), control means 81 and transceiver means 83 connected to an antenna 84 (or a physical link for communication with an MSC as shown in FIG. 9).

The means 80 receive the timing advance TA in the HO DETECTION (TA) message sent by the station with which the mobile station MS is to communicate (station BTS2) and sends the control signal HO CMD (TA) to the station with which the mobile station is communicating (station BTS1).

The transceiver means 83 handle communications with the switch controlling the BSC and specifically, in the case of external handover, transmission of the HO DETECT (TA) signals.

FIG. 9 shows a simplified structure of an MSC suitable for implementing the method of the present invention. It is used in the case of external handover because the timing advance computed by the target station (station BTS2) is sent to the mobile via the MSC for linking the controllers of two stations in different BSS.

The MSC comprises a transmit-receive antenna 92 connected to signal transceiver means 90 controlled by control means 91. The receive means receive the message HO DETECT (TA) from the controller of the station (BTS2) with which the mobile station MS is to communicate and the transmit means send the same message to the controller of the station (BTS1) with which the mobile station MS is currently communicating. As previously explained, the transceiver means 90 and the antenna 92 may be adapted for communication via a physical link with the controllers of the stations BTS1 and BTS2.

The modifications required to existing cellular mobile radio networks for implementing the new method are minor and can be effected by modifying the software controlling operation of the various components (mobile station, base transceiver station, base station controller and mobile services switching center).

The invention applies preferentially to a GSM type cellular mobile radio network and is of particular benefit if the stations of the network are asynchronous.

We claim:

1. A method of exchanging information in a cellular mobile radio network between a mobile station (MS), at least first and second base transceiver stations (BTS1, BTS2) and a base station controller (BSC) of said first and second base transceiver stations (BTS1, BTS2), said exchanges of information between said mobile station (MS) and said first and second base transceiver stations (BTS1, BTS2) being time-division multiple access exchanges, said method comprising the steps of:

transmitting from said base station controller (BSC) to said mobile station (MS), via said first base transceiver station (BTS1) with which said mobile station is communicating, an instruction (HO CHN) telling said mobile station (MS) to interrupt communication with said first base transceiver station (BTS1) in order to send to said second base transceiver station (BTS2) a first sequence of synchronization signals (HO ACCESS) enabling said second base transceiver station (BTS2) to calculate a timing advance (TA), said instruction (HO CHN) being transmitted when said mobile station (MS) moves from a first cell (C1) defined by the geographical coverage area of said first base transceiver station (BTS1) to a second cell (C2) defined by the geographical coverage area of said second base transceiver station (BTS2), said instruction (HO CHN) supplied to said mobile station (MS) also indicates that said mobile station (MS) must continue to communicate with said first base transceiver station (BTS1) immediately after sending said first sequence of synchronization signals (HO ACCESS) to said second base transceiver station (BTS2), transmitting said calculated timing advance (TA) from said second base transceiver station (BTS2) to said base station controller (BSC), and transmitting said calculated timing advance (TA) from said controller (BSC) to said mobile station (MS) via said first base transceiver station (BTS1), said mobile station (MS) communicating with said second base transceiver station (BTS2) in accordance with said timing advance (TA).

2. A method according to claim 1, further comprising the step of transmitting a second sequence of synchronization signals (HO ACCESS) from said mobile station (MS) to said second base transceiver station (BTS2) after said mobile station (MS) receives said calculated timing advance (TA).

3. A method according to claim 2, wherein said cellular mobile radio network is a GSM cellular mobile radio network, and further comprising the step of transmitting said calculated timing advance (TA) in a control signal (HO CMD (TA)) from one of said first and second base station controllers (BSC, BSC1), with which said first base transceiver station (BTS1) is associated, to said mobile station (MS), via said first base transceiver station (BTS1).

4. A method according to claim 2, wherein said first and second base transceiver stations (BTS1, BTS2) are asynchronous and the relative phase of their clock signals is unknown.

5. A method according to claim 1, wherein said cellular mobile radio network is a GSM cellular mobile radio network, and further comprising the step of transmitting said calculated timing advance (TA) from said second base transceiver station (BTS2) to one of said first and second controllers (BSC, BSC2), with which said second base transceiver station is associated, in a synchronization indication signal (HO DETECTION).

6. A method according to claim 5, wherein said cellular mobile radio network is a GSM cellular mobile radio network, and further comprising the step of transmitting said calculated timing advance (TA) in a control signal (HO CMD (TA)) from one of said first and second base station controllers (BSC, BSC1), with which said first base transceiver station (BTS1) is associated, to said mobile station (MS), via said first base transceiver station (BTS1).

7. A method according to claim 5, wherein said cellular mobile radio network is a GSM cellular mobile radio network, further comprising the step of transmitting said calculating timing advance (TA) from said second base station controller (BSC2) to said switching center (MSC) in a synchronization indication signal (HO DETECTION).

8. A method according to claim 7, wherein said cellular mobile radio network is a GSM cellular mobile radio network, and further comprising the step of transmitting said calculated timing advance (TA) from said switching center (MSC) to said first base station controller (BSC1) in a synchronization indication signal (HO DETECTION).

9. A method according to claim 5, wherein said first and second base transceiver stations (BTS1, BTS2) are asynchronous and the relative phase of their clock signals is unknown.

10. A method according to claim 5, wherein said cellular mobile radio network is a GSM cellular mobile radio network, and further comprising the step of transmitting said calculated timing advance (TA) from said switching center (MSC) to said first base station controller (BSC1) in a synchronization indication signal (HO DETECTION).

11. A method according to claim 1, wherein said first and second base transceiver stations (BTS1, BTS2) are asynchronous and the relative phase of their clock signals is unknown.

12. A method according to claim 1, wherein said cellular mobile radio network is a GSM cellular mobile radio network, and further comprising the step of transmitting said calculated timing advance (TA) in a control signal (HO CMD (TA)) from one of said first and second base station controllers (BSC, BSC1) with which said first base transceiver station (BTS1) is associated, to said mobile station (MS), via said first base transceiver station (BTS1).

13. A method according to claim 12, wherein said first and second base transceiver stations (BTS1, BTS2) are asynchronous and the relative phase of their clock signals is unknown.

14. A method of exchanging information in a cellular mobile radio network between a mobile station (MS), at least first and second base transceiver stations (BTS1, BTS2), first and second base station controllers (BSC1, BSC2) respectively controlling said at least first and second base transceiver stations (BTS1, BTS2), and a mobile services switching center (MSC) controlling said first and second base station controllers (BSC1, BSC2), said exchanges of information between said mobile station and said at least first and second base transceiver stations (BTS1, BTS2) being time-division multiple access exchanges, said method comprising the steps of:

transmitting an instruction (HO CHN) from said first base station controller (BSC1) to said mobile station (MS) telling said mobile station (MS) to interrupt communication with said first base transceiver station (BTS1) with which said mobile station (MS) is communicating in order to send a first sequence of synchronization signals (HO ACCESS) to said second base transceiver station (BTS2) enabling said second base transceiver station (BTS2) to calculate a timing advance (TA), said instruction (HO CHN) being transmitted when said mobile station (MS) moves from a first cell (C1) defined by the geographical coverage area of said first base transceiver station (BTS1) to a second cell (C2) defined by the geographical coverage area of said second base transceiver station (BTS2), said instruction (HO CHN) supplied to said mobile station (MS) also indicates that said mobile station (MS) must continue to communicate with said first base transceiver station (BTS1) immediately after sending said first sequence of synchronization signals (HO ACCESS) to said second base transceiver station (BTS2), transmitting said calculated timing advance (TA) from said second base transceiver station (BTS2) to said second base station controller (BSC2), transmitting said calculated timing advance (TA) from said second controller (BSC2) to said mobile services switching center (MSC), transmitting said calculated timing advance (TA) from said mobile services switching center (MSC) to said first base station controller (BSC1), and transmitting said calculated timing advance (TA) from said first base station controller (BSC1) to said mobile station (MS) via to said first base transceiver station (BTS1), said mobile station (MS) communicating With said second base transceiver station (BTS2) in accordance with said timing advance (TA).

15. A method according to claim 14, further comprising the step of sending a second sequence of synchronization signals (HO ACCESS) from said mobile station (MS) to said second base transceiver station (BTS2) after said mobile station (MS) receives said calculated timing advance (TA).

16. A method according to claim 15, wherein said cellular mobile radio network is a GSM cellular mobile radio network, and further comprising the step of transmitting said calculated timing advance (TA) in a control signal (HO CMD (TA)) from one of said first and second base station controllers (BSC, BSC1), with which said first base transceiver station (BTS1) is associated, to said mobile station (MS), via said first base transceiver station (BTS1).

17. A method according to claim 15, wherein said cellular mobile radio network is a GSM cellular mobile radio network, further comprising the step of transmitting said calculating timing advance (TA) from said second base station controller (BSC2) to said switching center (MSC) in a synchronization indication signal (HO DETECTION).

18. A method according to claim 17, wherein said cellular mobile radio network is a GSM cellular mobile radio network, and further comprising the step of transmitting said calculated timing advance (TA) from said switching center (MSC) to said first base station controller (BSC1) in a synchronization indication signal (HO DETECTION).

19. A method according to claim 15, wherein said first and second base transceiver stations (BTS1, BTS2) are asynchronous and the relative phase of their clock signals is unknown.

20. A method according to claim 15, wherein said cellular mobile radio network is a GSM cellular mobile radio network, and further comprising the step of transmitting said calculated timing advance (TA) from said switching center (MSC) to said first base station controller (BSC1) in a synchronization indication signal (HO DETECTION).

21. A method according to claim 14, wherein said cellular mobile radio network is a GSM cellular mobile radio network, and further comprising the step of transmitting said calculating timing advance (TA) from said second base station controller (BSC2) to said switching center (MSC) in a synchronization indication signal (HO DETECTION).

22. A method according to claim 21, wherein said cellular mobile radio network is a GSM cellular mobile radio network, and further comprising the step of transmitting said calculated timing advance (TA) in a control signal (HO CMD (TA)) from one of said first and second base station controllers (BSC, BSC1), with which said first base transceiver station (BTS1) is associated, to said mobile station (MS), via said first base transceiver station (BTS1).

23. A method according to claim 21, wherein said first and second base transceiver stations (BTS1, BTS2) are asynchronous and the relative phase of their clock signals is unknown.

24. A method according to claim 21, wherein said cellular mobile radio network is a GSM cellular mobile radio network, and further comprising the step of transmitting said calculated timing advance (TA) from said switching center (MSC) to said first base station controller (BSC1) in a synchronization indication signal (HO DETECTION).

25. A method according to claim 14, wherein said cellular mobile radio network is a GSM cellular mobile radio network, and further comprising the step of transmitting said calculated timing advance (TA) from said switching center (MSC) to said first base station controller (BSC1) in a synchronization indication signal (HO DETECTION).

26. A method according to claim 25, wherein said cellular mobile radio network is a GSM cellular mobile radio network, and further comprising the step of transmitting said calculated timing advance (TA) in a control signal (HO CMD (TA)) from one of said first and second base station controllers (BSC, BSC1), with which said first base transceiver station (BTS1) is associated, to said mobile station (MS), via said first base transceiver station (BTS1).

27. A method according to claim 25, wherein said first and second base transceiver stations (BTS1, BTS2) are asynchronous and the relative phase of their clock signals is unknown.

28. A method according to claim 14, wherein said cellular mobile radio network is a GSM cellular mobile radio network, and further comprising the step of transmitting said calculated timing advance (TA) from said second base transceiver station (BTS2) to one of said first and second controllers (BSC, BSC2), with which said second base transceiver station is associated, in a synchronization indication signal (HO DETECTION).

29. A method according to claim 28, wherein said cellular mobile radio network is a GSM cellular mobile radio network, and further comprising the step of transmitting said calculated timing advance (TA) from said switching center (MSC) to said first base station controller (BSC1) in a synchronization indication signal (HO DETECTION).

30. A method according to claim 28, wherein said cellular mobile radio network is a GSM cellular mobile radio network, further comprising the step of transmitting said calculating timing advance (TA) from said second base station controller (BSC2) to said switching center (MSC) in a synchronization indication signal (HO DETECTION).

31. A method according to claim 30, wherein said cellular mobile radio network is a GSM cellular mobile radio network, and further comprising the step of transmitting said calculated timing advance (TA) from said switching center (MSC) to said first base station controller (BSC1) in a synchronization indication signal (HO DETECTION).

32. A method according to claim 14, wherein said cellular mobile radio network is a GSM cellular mobile radio network, and further comprising the step of transmitting said calculated timing advance (TA) in a control signal (HO CMD (TA)) from one of said first and second base station controllers (BSC, BSC1), with which said first base transceiver station (BTS1) is associated, to said mobile station (MS), via said first base transceiver station (BTS1).

33. A method according to claim 14, wherein said first and second base transceiver stations (BTS1, BTS2) are asynchronous and the relative phase of their clock signals is unknown.

34. A mobile station (MS) adapted to communicate by time-division multiple access with at least first and second base transceiver stations (BTS1,BTS2) of a cellular mobile radio network, said mobile station (MS) comprising:

signal transceiver means (60, 65) for receiving a timing advance (TA) from said first base transceiver station (BTS1) when said mobile station moves from a first cell (C1), defined by the geographical coverage area of said first base transceiver station (BTS1) with which said mobile station (MS) is communicating, to a second cell (C2), defined by the geographical coverage area of said second base transceiver station (BTS2), means (61), coupled to said signal transceiver means (60,65), for detecting an instruction (HO CHN) transmitted to said mobile station (MS) by said first base transceiver station (BTS1) and which instructs said mobile station (MS) to interrupt communication with said first base transceiver station (BTS1) and to send a first sequence of synchronization signals (HO ACCESS) to said second base transceiver station (BTS2) to enable said second base transceiver station (BTS2) to calculate a timing advance (TA), said instruction (HO CHN) also instructing said mobile station (MS) to continue communicating with said first base transceiver station (BTS1) immediately after sending said first sequence of synchronization signals (HO ACCESS) to said second base transceiver station (BTS2), and means (62), coupled to said instruction detecting means (61), for detecting a control signal (HO CMD (TA)) transmitted to said mobile station (MS) by said first base transceiver station (BTS1) and containing said timing advance (TA), said control signal instructing said mobile station (MS) to communicate with said second base transceiver station (BTS2) in accordance with said timing advance (TA).

35. A mobile station according to claim 34, further comprising means (63), coupled to said control signal detecting means (62), for deciding to send a second sequence of synchronization signals (HO ACCESS) to said second base transceiver station (BTS2) when said deciding means receives said control signal (HO CMD (TA)) containing said timing advance (TA) to enable said mobile station (MS) to communicate with said second base transceiver station (BTS2).

36. A base station controller (BSC) for controlling at least first and second base transceiver stations (BTS1,BTS2) of a cellular mobile radio network having at least one mobile station, said base station controller (BSC) comprising:

means for receiving a request signal from said first base transceiver station (BTS1); and means for sending, in accordance with said request signal, an instruction to said first base transceiver station (BTS1) with which said mobile station (MS) is communicating, said first base transceiver station (BTS1) retransmitting this instruction to said mobile station (MS), said instruction instructing said mobile station (MS) to interrupt communication with said first base transceiver station (BTS1) in order to send a sequence of synchronization messages (HO ACCESS) to said second base transceiver station (BTS2) to enable said second base transceiver station (BTS2) to calculate a timing advance (TA), in accordance with which said mobile station (MS) is to communicate with said second base transceiver station (BTS2), and to continue communicating with said first base transceiver station (BTS1) immediately after sending said sequence of synchronization messages to said second base transceiver station (BTS2).

37. A base station controller (BSC) as claimed in claim 36, further comprising:

means (80) for receiving said timing advance (TA) transmitted to said base station controller (BSC) in a message (HO DETECTION (TA)) sent by said second base transceiver station (BTS2) with which said mobile station (MS) wishes to communicate, after at least one of said synchronization messages (HO ACCESS) to enable said mobile station (MS) to communicate with said second base transceiver station (BTS2) is sent by said mobile station (MS) to said second base transceiver station (BTS2) when said mobile station (MS) moves from a first cell (C1), defined by the geographical coverage area of said first base transceiver station (BTS1) with which said mobile station (MS) is communicating, to a second cell (C2), defined by the geographical coverage area of said second base transceiver station (BTS2), and means (80) for sending a control signal (HO CMD (TA)), containing said timing advance (TA) for said mobile station (MS), to said first base transceiver station (BTS1), said control signal (HO CMD (TA)) instructing said mobile station (MS) to communicate with said second base transceiver station (BTS2) in accordance with said timing advance (TA).

38. A controller according to claim 37, further comprising means (83, 84) for sending information (HO DETECT (TA)) containing said calculated timing advance (TA) to a mobile services switching center (MSC) upon reception of said message (HO DETECTION (TA)) sent by said second base transceiver station (BTS2), said mobile services switching center (MSC) controlling said second base transceiver station (BTS2) based on said information.

39. A system for exchanging information between a mobile station (MS), at least first and second base transceiver stations (BTS1, BTS2), and a base station controller (BSC) for said at least first and second base transceiver stations (BTS1, BTS2), exchanges of said information between said mobile station (MS) and said at least first and second base transceiver stations (BTS1, BTS2) being time-division multiple access exchanges, said mobile station (MS) comprising means (61) for detecting an instruction (HO CHN) when said mobile station moves from a first cell (C1) defined by the geographical coverage area of said first base transceiver station (BTS1) with which said mobile station (MS) is communicating to a second cell (C2) defined by the geographical coverage area of said second base transceiver station (BTS2), said instruction (HO CHN) instructing said mobile station (MS) to send a sequence of synchronization signals (HO ACCESS) to said second base transceiver station (BTS2) which comprises means (71) for calculating, based on receipt of said synchronization signals (HO ACCESS), a timing advance (TA) to be supplied to said mobile station (MS), said mobile station (MS) continuing to communicate with said first base transceiver station (BTS1) immediately after sending said sequence of synchronization signals (HO ACCESS) to said second base transceiver station (BTS2), said second base transceiver station (BTS2) further including means (70) for sending said calculated timing advance (TA) to said controller (BSC), said base station controller (BSC) comprising means (80) for sending said calculated timing advance (TA) to said first base transceiver station (BTS1), and said first base transceiver station (BTS1) comprising means (70) for forwarding said calculated timing advance (TA) to said mobile station (MS), said mobile station (MS) communicating with said second base transceiver station (BTS2) in accordance with said timing advance (TA).

40. A system for exchanging information in a cellular mobile radio network between a mobile station (MS), a first base transceiver station (BTS1) associated with a first base station controller (BSC1), and a second base transceiver station (BTS2) associated with a second base station controller (BTS2), said first and second base station controllers (BSC1, BSC2) being controlled by a mobile services switching center (MSC), said exchanges of said information between said mobile station (MS) and said first and second base transceiver stations (BTS1, BTS2) being time-division multiple access exchanges, said mobile station (MS) comprising means (51) for detecting an instruction (HO CHN) from said first base transceiver station (BTS1) when said mobile station (MS) moves from a first cell (C1) defined by the geographical coverage area of said first base transceiver station (BTS1) with which said mobile station (MS) is communicating to a second cell (C2) defined by the geographical coverage area of said second base transceiver station (BTS2), said instruction (HO CHN) instructing said mobile station (MS) to send a sequence of synchronization signals (HO ACCESS) to said second base transceiver station (BTS2) which comprises means for calculating, based on receipt of said sequence of synchronization signals (HO ACCESS), a timing advance (TA) to be supplied to said mobile station (MS), said mobile station (MS) continuing to communicate with said first base transceiver station (BTS1) immediately after sending said sequence of synchronization signals (HO ACCESS) to said second base transceiver station (BTS2), said second base transceiver station (BTS2) further comprising means (70) for sending said calculated timing advance (TA) to said switching center (MSC) via said second base station controller (BSC2), said switching center (MSC) comprising means (90) for sending said calculated timing advance (TA) to said first base station controller (BSC1), said first base station controller (BSC1) comprising means (80) for sending said calculated timing advance (TA) to said first base transceiver station (BTS1), and said first base transceiver station (BTS1) comprising means (70) for forwarding said calculated timing advance (TA) to said mobile station (MS), said mobile station (MS) communicating with said second base transceiver station (BTS2) in accordance with said timing advance (TA).

* * * * *